United States Patent [19]

Ogawa et al.

[11] 4,269,860

[45] May 26, 1981

[54] PROCESS FOR PREPARING A GAS-DEVELOPING CHEWING GUM

[75] Inventors: Koichi Ogawa, Tokyo; Masatoshi Terasawa, Tokorozawa; Shizuo Iwata, Tama; Yoshihisa Suzuki, Kawasaki; Hideki Tanakamaru, Urawa, all of Japan

[73] Assignee: Lotte Co. Ltd., Tokyo, Japan

[21] Appl. No.: 93,934

[22] Filed: Nov. 13, 1979

[30] Foreign Application Priority Data

Sep. 21, 1979 [JP] Japan ................... 54-120706

[51] Int. Cl.$^3$ ................................................ A23G 3/30
[52] U.S. Cl. ................................... 426/5; 426/103
[58] Field of Search ........................ 426/3–6, 426/103

[56] References Cited

U.S. PATENT DOCUMENTS

| 810,210 | 1/1906 | Laws | 426/5 |
|---|---|---|---|
| 3,071,476 | 1/1963 | Werft et al. | 426/5 |
| 3,316,154 | 4/1967 | Sellers | 426/5 |
| 3,795,744 | 3/1974 | Ogawa et al. | 426/3 |
| 3,845,217 | 10/1974 | Ferno | 426/3 |
| 3,857,963 | 12/1974 | Graff | 426/5 |
| 4,150,161 | 4/1979 | Rudolph | 426/3 |
| 4,151,270 | 4/1979 | Ream | 426/3 |

FOREIGN PATENT DOCUMENTS

| 49-21076 | 5/1974 | Japan | 426/3 |
|---|---|---|---|
| 49-34826 | 9/1974 | Japan | 426/3 |

*Primary Examiner*—Jeanette M. Hunter

[57] ABSTRACT

The gas-developing chewing gum of the invention is prepared by granulating carbonate or bicarbonate salt together with sodium sulfate or anhydrous sodium sulfate and at least one of sugars, polyphosphates and organic acid salts and dispersing sugar, fruit powder, fruit acid (organic acid) and flavoring ingredient throughout the resulting granules to form the gas-developing composition, which is then coated with or filled into the chewing gum.

3 Claims, No Drawings

PROCESS FOR PREPARING A GAS-DEVELOPING CHEWING GUM

BACKGROUND OF THE INVENTION

This invention relates to a gas-developing (or sparkling) chewing gum and more particularly to a gas-developing chewing gum containing a gas-developing composition in a central cavity thereof.

Heretofore, the gas-developing chewing gum is known from the Japanese patent publication NO. 23035/71, which utilizes a gas-forming property based on reaction of a carbonate or bicarbonate salt with an acid, especially an organic acid. The conventional gas-developing chewing gum, however, has a fatal disadvantage for storage stability in that direct contact of the carbonate or bicarbonate salt with the organic acid and dispersion of the gas-developing composition throughout the chewing gum without any reaction-controlling measure cause the pressure reaction of the carbonate or bicarbonate salt with the organic acid in the presence of moisture of the chewing gum, thereby to give off carbonic acid gas uselessly and to reduce a gas-developing effect considerably upon chewing.

Further, the gas-developing composition for a gas-developing drink is also known, which employs sugars, polyphosphates or organic acid salts as a stabilizer or excipient for the carbonate or bicarbonate salt. When these materials are used, however, there arise disadvantages in that the sugars cause a browning phenomenon, that the polyphosphates make storage of the product difficult and that the organic acid salts have an intrinsic salty taste.

Now it has been found out that if the carbonate or bicarbonate salt is granulated together with sodium sulfate or anhydrous sodium sulfate as the stabilizer or excipient in place of or in combination with the sugars, polyphosphates and organic acid salts to form granules, into which are then mixed and dispersed the sugar powder, fruit powder, fruit acid and flavoring ingredient to prepare the gas-developing composition, the direct contact of the carbonate or bicarbonate salt with the acid can be avoided, thereby preventing the premature reaction therebetween. Furthermore, it has been found out that if the resulting gas-developing composition is coated with or filled into the chewing gum, an adverse effect of moisture present in or absorbed by the chewing gum on the storage stability is significantly prevented and a good gas-developing performance is maintained even if the moisture comes into contact with the gas-developing composition, because the moisture is absorbed by a large amount of the sugars dispersed throughout the composition.

SUMMARY OF THE INVENTION

Accordingly, a general object of the invention is to provide a gas-developing (or sparkling) chewing gum which is prevented from the premature reaction of the carbonate or bicarbonate salts with the acid and hence the reduction of the storage stability.

A principal object of the invention is to provide a process for preparing a gas-developing chewing gum which comprises granulating a carbonate or bicarbonate salt together with sodium sulfate or anhydrous sodium sulfate or together with a combination of sodium sulfate or anhydrous sodium sulfate with at least one of polyphosphates, sugars and organic acid salts to form granules; dispersing sugar, fruit powder, fruit acid and flavoring ingredient throughout the granules to form a gas-developing composition; and either coating the composition with a chewing gum or filling the same into a central cavity of the chewing gum.

Another object of the invention is to provide a gas-developing (or sparkling) chewing gum prepared by the process described hereinbefore.

DETAILED DESCRIPTION OF THE INVENTION

The carbonate or bicarbonate salt used for preparing the gas-developing composition of the invention includes alkli metal or alkali earth metal salts which are acceptable for food use. Preferably, sodium bicarbonate (sodium hydrogen carbonate) is used on the economical and reactive reasons. Polyphosphates used as the stabilizer or excipient in combination with sodium sulfate or anhydrous sodium sulfate include metaphosphates (such as sodium and potassium metaphosphates) and other polyphosphates. The sugars for the same purpose include sucrose, glucose, fructose, lactose, mannose and others. The organic acid salts include tartarate, citrate, malate and any other organic acid salts which are acceptable for food use.

In order to granulate the components described hereinbefore any granulating technique well-known in the food industry may be employed. For example, sodium sulfate or anhydrous sodium sulfate is added to and mixed with carbonate or bicarbonate salt, to which is then added water or a solution of a binder and admixed by stirring. Thereafter, the mixture may be subjected to a granulating machine for forming the granules, which are then dried in a conventional manner. The granules may be formulated from about 0.5 to 2.5 parts by weight of anhydrous sodium sulfate and 0 to about 5 parts by weight of the sugars, polyphosphates and organic acid salts in relation to 100 parts by weight of the main carbonate or bicarbonate salt.

In order to prepare the gas-developing composition of the invention, sugar, fruit powder, fruit acid and flavoring ingredient may be dispersed throughout the granules as prepared hereinbefore. The sugar to be dispersed includes sucrose, glucose, fructose, lactose, mannose and the like. The fruit powder may serve as an organic acid and a flavoring ingredient and may be prepared from any kind of fruits materials by preference. The fruit acid is used as an organic acid ingredient which reacts with the carbonate or bicarbonate salt to give off carbonic acid gas, and includes tartaric, citric, malic and other organic acids. The flavoring ingredient may be of any type of flavors well known in the food industry, such as flavors for cola, cider and other sparkling drinks. Both the sugar and the fruit acid to be dispersed may be added preferably in the granulate form similarly to the carbonate or bicarbonate granules. Thus, the fruit acid may be admixed and kneaded with the sugar such as lactose or sucrose powder, and granulated to form acid granules showing uniform dispersibility and better solubility. The sugar may also be used in the granulate form for the same purpose.

Dispersing operation for obtaining the gas-developing composition may be conducted in any well-known method, for example by homogeneously blending the granular components by means of a blender or disperser to such extent as not to break up the granules. The ingredients to be dispersed throughout the carbonate or bicarbonate granules may be in a total amount of 5.50 to 6.00 parts by weight in relation to 100 parts by weight of the carbonate or bicarbonate granules, of which the fruit acid may be from 90 to 150 parts by weight. For example, the preferred blending proportion of the gas-developing composition maybe shown as follows:

| | |
|---|---|
| Sugar (e.g. glucose) granules | 65–82% |
| Carbonate or bicarbonate (e.g. sodium bicarbonate) granules* | 9–17.5% |
| Fruit acid (e.g. tartaric acid) granules | 9–17.5% |
| Flavor powder | 0.05–0.2% |

*This granular ingredient is prepared by granulating the carbonate or bicarbonate salt together with sodium sulfate or anhydrous sodium sulfate and optionally with sugars, polyphosphates and organic acid salts.

Finally, the gas-developing composition thus prepared is either coated with a chewing gum or filled into a central cavity of the latter to produce a gas-developing chewing gum according to the invention. The chewing gum surrounding the gas-developing composition may be of any type such as a sugar-containing or sugarless type, and if desired a bubble chewing gum may be utilized. The composition and the preparing method of these chewing gums are well known in the art. For example, about 20 parts of a gum base comprising 0 to 20 parts of a natural resin (such as chicle, jeltong), 15 to 25 parts of a natural wax, 20 to 30 parts of a vinyl acetate resin, 15 to 25 parts of an ester gum, 5 to 20 parts of a synthetic rubber and 25 to 30 parts of other additives (such as a filler) may be kneaded with 40 to 60 parts of sucrose, 5 to 10 parts of glucose, 5 to 10 parts of starch hydrolyzate syrup, 2 to 3 parts of a softening agent, 0.5 to 1.0% of a flavor and 0.2 to 0.5% of a coloring agent to prepare the chewing gum, all the parts and percentages being based on weight.

Coating or filling of the gas-developing composition may be carried out in any known technique. In order to fill the composition into the chewing gum, for example, the latter may be heated and extruded from an extruder while the gas-developing composition is injected into the center of the chewing gum. Thereafter, the filled chewing gum is cooled and stamped. Generally, the gas-developing composition is filled in an amount of 5 to 20 parts based on 80 to 95 parts of the chewing gum. Preferably, about 10 parts of the gas-developing composition is filled into about 90 parts of the chewing gum. Alternatively, 0 to 5 parts of the gas-developing composition may be homogeneously dispersed in 95 to 100 parts of the chewing gum and then 85 to 95 parts of the resulting chewing gum containing the dispersed composition may be used for surrounding further 5 to 15 parts of the gas-developing composition.

In accordance with the gas-developing chewing gum of the invention, the direct contact of the carbonate or bicarbonate salt with the acid agent may be minimized and the gas-developing composition is located in the center of the chewing gum, so that the premature gas-forming reaction in the presence of moisture of the chewing gum is effectively prevented and the moisture accessible to the central gas-developing composition may be readily absorbed by the large amount of dispersed sugar, resulting in the excellent gas-developing (or sparkling) chewing gum having better storage stability than the conventional type. Accordingly, the gas-developing chewing gum according to the invention has more improved long-lasting gas-developing performance with a less amount of the gas-developing composition than the conventional type.

The following examples are presented solely for purposes of illustration and should not be construed as limiting the invention.

EXAMPLE 1

Preparation of the sodium bicarbonate granules:
The following materials were mixed and granulated to form granules.

| | | |
|---|---|---|
| Sodium bicarbonate | | 95.0% by weight |
| Sodium metaphosphate | | 3.7% by weight |
| Potassium metaphosphate | | 0.3% by weight |
| Sodium sulfate | | 1.0% by weight |
| | Total | 100.0% by weight |

Preparation of the gas-developing composition:
The following ingredients were dispersed throughout the sodium bicarbonate granules in the following proportion to prepare the gas-developing composition.

| | |
|---|---|
| Sodium bicarbonate granules | 12% by weight |
| Glucose granules | 70% by weight |
| Tartaric acid granules* | 18% by weight |
| Flavor | proper quantity |

*This ingredient was prepared by mixing and granulating 80% by weight of tartaric acid with 20% by weight of powder sugar (lactose if desired).

Preparation of the chewing gum:
The sugarless chewing gum was prepared from the following materials in the convention manner.

| | |
|---|---|
| Gum base | 25% by weight |
| Sorbitol | 45% by weight |
| Mannitol | 15% by weight |
| 70% Sorbitol | 10% by weight |
| Flavor and other additives | 5% by weight |
| Total | 100% by weight |

Preparation of the gas-developing chewing gum:
90 parts by weight of the resulting sugarless chewing gum was heated and extruded from an extruder while 10 parts by weight of the gas-developing composition is injected into the center of the chewing gum. The center-filled chewing gum thus obtained was cooled and stamped to produce the gas-developing chewing gum.

For the purpose of comparison, the control gas-developing chewing gum was prepared by homogeneously dispersing 10 parts by weight of a simple mixture of sodium bicarbonate and tartaric acid into 90 parts by weight of the same sugarless chewing gum as prepared hereinbefore.

EXAMPLE 2

Preparation of the sodium bicarbonate granules:
The following materials were mixed and granulated to form granules containing no polyphosphates.

| | | |
|---|---|---|
| Sodium bicarbonate | | 98% weight |
| Sodium sulfate | | 2% by weight |
| | Total | 100% by weight |

Preparation of the gas-developing composition:

The following ingredients were dispersed throughout the sodium bicarbonate granules in the following proportion to prepare the gas-developing composition.

| | |
|---|---|
| Sodium bicarbonate granules | 10% by weight |
| Glucose granules | 75% by weight |
| Tartaric acid granules* | 15% by weight |
| Flavor | proper quantity |

*This ingredient was prepared by mixing and granulating 80% by weight of tartaric acid with 20% by weight of powder sugar (lactose if desired).

Preparation of the chewing gum:

The chewing gum without sucrose was prepared from the following materials in the conventional manner.

| | |
|---|---|
| Gum base | 30% by weight |
| Glucose | 50% by weight |
| Lactose | 5% by weight |
| Corn syrup | 10% by weight |
| Flavor and other additives | 5% by weight |
| Total | 100% by weight |

Preparation of the gas-developing chewing gum:

90 parts by weight of the resulting chewing gum was heated and extruded while 10 parts by weight of the gas-developing composition being injected into the center of the chewing gum. The center-filled chewing gum was then cooled and stamped to produce the gas-developing chewing gum.

Panel Test

After storage for one month under the condition of the room temperature and the relative humidity of 80%, the inventive and the control gas-developing chewing gums were organoleptically evaluated for a gas-developing coolness and feeling by a panel comprising 100 persons, the results were shown in the following:

| | Gas-developing coolness | Stronger gas-developing feeling |
|---|---|---|
| The inventive product (Ex. 1 and 2) | 90 | 99 |
| The control product | 10 | 1 |

As apparent from the results, the gas-developing chewing gum according to the invention has more improved storage stability than the control.

What is claimed is:

1. A process for preparing a gas-developing chewing gum comprising the steps of granulating as a basic component 92 to 97 parts by weight of a salt selected from the group consisting of carbonate, bicarbonate salt and mixtures thereof, together with 0.5 to 2.0 parts by weight of a constituent selected from the group consisting of sodium sulfate and anhydrous sodium sulfate and mixtures thereof, and with 0 to 5 parts by weight of a constituent selected from the group consisting of polyphosphates, sugars and organic acid salts and mixtures thereof; admixing 5 to 50 parts by weight of said granulated basic component with 50 to 95 parts by weight of an acidic component selected from the group consisting of fruit acid, fruit powder, sugar, flavoring agent and mixtures thereof to form a gas-developing composition; and thereafter introducing 5 to 20 parts by weight of said composition into 80 to 95 parts by weight of a chewing gum.

2. The process as claimed in claim 1, wherein 5 to 15 parts by weight of the gas-developing composition is introduced into a central cavity formed in said chewing gum to fill the same.

3. A gas-developing chewing gum which is prepared according to the process of claim 1 or 2.

* * * * *